Patented Dec. 30, 1930

1,786,650

UNITED STATES PATENT OFFICE

JOHN M. GOODWIN, OF PORT ARTHUR, TEXAS, ASSIGNOR TO THE TEXAS COMPANY, OF NEW YORK, N. Y., A CORPORATION OF DELAWARE

TREATING HYDROCARBON OIL

No Drawing.  Application filed March 16, 1928.  Serial No. 262,318.

This invention relates to treating hydrocarbon oil and has particular reference to the purification and stabilization of the more volatile hydrocarbon oils such as naphtha and the like. The invention is especially adapted for the purification and stabilization of volatile hydrocarbon oils obtained from the pyrogenous decomposition of less volatile hydrocarbon oils. The invention, in its broadest application, comprises a process wherein volatile hydrocarbon oils are stabilized and purified by treatment with concentrated sulfuric acid in the presence of hydrogen sulfide.

In a preferred method of practicing the invention the oil to be stabilized and purified, which may be a cracked naphtha having substantially the boiling range of gasoline, is first brought in contact with hydrogen sulfide in order that the gas may become dissolved in the oil, after which the oil is mixed with the desired quantity of concentrated sulfuric acid.

In a modified form of the invention, the oil which is to be stabilized and purified may be subjected to low temperature distillation and rectification for the removal of fixed gases and the comparatively lower boiling hydrocarbons such as propane and the like, such distillation effecting the substantially complete removal of any hydrogen sulfide which may have been present in the oil originally. The oil is then brought in contact with a gas comprising hydrogen sulfide, which is dissolved therein in the required quantity, after which the oil is treated with concentrated sulfuric acid.

The invention may be readily understood from a consideration of the following description of a particular application thereof, it being understood that the description is given merely for the purpose of illustrating the invention which is in no way limited thereby.

In the example, the oil which is to be purified and stabilized may consist of a naphtha obtained from a cracking process operating under superatmospheric pressure and may have an upper boiling range or end point equivalent to approximately that of gasoline, which may be approximately 400° F. The naphtha as evolved from the cracking apparatus will ordinarily contain an appreciable quantity of dissolved fixed gases and also such low boiling constituents as propane and the like which should not remain in the finished product in such quantity as to render the gasoline unsuited for use in motor cars. Accordingly the naphtha may be subjected to a low temperature process of distillation and rectification whereby the very low boiling constituents are separated, usually to such an extent that in conducting a standard American Society for Testing Material 100 c. c. distillation on a sample thereof a recovery of approximately 94% to 96% may be had.

In the usual type of cracking process in which higher boiling hydrocarbon oils are converted into lower boiling hydrocarbon oils by the application of heat under elevated pressure, a certain amount of hydrogen sulfide may be produced from the decomposition of sulfur compounds in the lower boiling oil, a portion of which may become dissolved in a naphtha withdrawn from the process. However, in the beforementioned low temperature process of rectification, hydrogen sulfide dissolved in the naphtha will be substantially completely removed, together with the fixed gases and the undesirable lower boiling constituents of the nature of propane.

In the treatment of volatile hydrocarbon oils in accordance with the present invention, the presence of hydrogen sulfide in the naphtha during contact with concentrated sulfuric acid is essential. Accordingly, if the material removed from the naphtha during the low temperature process of rectification contains an appreciable quantity of hydrogen sulfide, the total material may be treated for the removal of condensable gasoline constituents by any suitable process, as by compression and cooling, and then the remaining fixed gases, which include hydrogen sulfide, may be contacted with the naphtha in order that the hydrogen sulfide may be redissolved therein. Hydrogen sulfide from any other suitable source may be supplied to the naphtha and it is, of course, unnecessary that the hydrogen sulfide be dissolved in the naphtha prior to its contact with acid. In fact, hydrogen sulfide may be mixed with the naphtha at the same time that it is being contacted with acid.

It has been found by experiment that, under ordinary conditions, the quantity of hydrogen sulfide present during the treatment of a cracked naphtha with sulfuric acid of about 50° Bé. should not be less than approximately five pounds per thousand barrels of naphtha. Apparently the presence of hydrogen sulfide in larger quantities is of no particular harm during the acid treatment but is undesirable due to the cost of removing it from the acid treated product by the treatment with chemicals.

After having dissolved the required quantity of hydrogen sulfide, the naphtha is treated with concentrated sulfuric acid, the preferred method being a continuous treatment in which the naphtha and the required quantity of sulfuric acid, which may be approximately 4 pounds of acid for each barrel of naphtha, are thoroughly mixed, and the acid settled out and separated, after which the naphtha may be neutralized by treatment with a suitable alkali, such as a solution of caustic soda. A final treatment with a solution of sodium plumbite may be applied if necessary in order to remove any sulfur compounds remaining in the oil.

In the treatment of cracked naphthas with concentrated sulfuric acid by the method of the present invention, it is ordinarily desirable to use acid having a concentration less than 66° Bé. and usually of a strength corresponding to approximately 50 to 60° Bé.

Although the invention has been described particularly with reference to the purification and stabilization of cracked naphtha, it will be understood that it is equally applicable to the treatment of volatile hydrocarbon oils derived from other sources. The actual part played by the hydrogen sulfide in the chemical reaction of the stabilizing and purifying process is not known but, by the practice of the invention, a superior product is obtained, particularly as regards initial color and stability of color.

Obviously many modifications and variations of the invention, as hereinbefore set forth, may be made without departing from the spirit and scope thereof, and therefore, only such limitations should be imposed as are indicated in the appended claims.

I claim:

1. The process of stabilizing and purifying petroleum naphtha which comprises contacting the oil with a gas comprising hydrogen sulfide, whereby a relatively small quantity of hydrogen sulfide is absorbed by the oil, and then treating the oil with concentrated sulfuric acid.

2. The process of stabilizing and purifying petroleum naphtha which comprises contacting the oil with a gas comprising hydrogen sulfide until approximately 0.005 of a pound of hydrogen sulfide is dissolved for each barrel (42 gals.) of oil, and then treating the oil with concentrated sulfuric acid.

3. The process of stabilizing and purifying cracked naphtha which comprises removing the undesirable lower boiling constituents by rectification whereby the naphtha is substantially freed from hydrogen sulfide and then treating with concentrated sulfuric acid in the presence of a relatively small quantity of hydrogen sulfide.

4. The process of stabilizing and purifying cracked naphtha which comprises removing the undesirable lower boiling constituents by rectification whereby the naphtha is substantially freed from hydrogen sulfide, contacting the naphtha with a gas comprising hydrogen sulfide whereby a relatively small quantity of hydrogen sulfide is absorbed in the oil and then treating the naphtha containing absorbed hydrogen sulfide with concentrated sulfuric acid.

5. The process of stabilizing and purifying cracked naphtha which comprises removing the undesirable lower boiling constituents by rectification whereby the naphtha is substantially freed from hydrogen sulfide, contacting the naphtha with a gas comprising hydrogen sulfide to the extent that approximately 0.005 of a pound of hydrogen sulfide is dissolved therein for each barrel (42 gals.) of naphtha, and then treating with concentrated sulfuric acid of a concentration less than that corresponding to 66° Bé.

In witness whereof I have hereunto set my hand this 5th day of March, 1928.

JOHN M. GOODWIN.